United States Patent [19]

Sakamoto

[11] Patent Number: 5,138,144
[45] Date of Patent: Aug. 11, 1992

[54] IMAGE READING METHOD AND APPARATUS

[75] Inventor: Takashi Sakamoto, Kyoto, Japan

[73] Assignee: Dainnippon Screen Mfg. Co., Ltd., Japan

[21] Appl. No.: 684,040

[22] Filed: Apr. 11, 1991

[30] Foreign Application Priority Data

Apr. 18, 1990 [JP] Japan ................... 2-104240

[51] Int. Cl.⁵ ............................. H01J 40/14
[52] U.S. Cl. ..................... 250/208.1; 358/444
[58] Field of Search ............. 250/208.1; 358/404, 358/444, 261.4, 453

[56] References Cited

U.S. PATENT DOCUMENTS 4,761,685  8/1988  Asaida et al. .................. 358/213.13
5,033,102  7/1991  Nakajima et al. .................. 358/453

Primary Examiner—David C. Nelms
Assistant Examiner—K. Shami
Attorney, Agent, or Firm—Ostrolenk, Faber, Gerb & Soffen

[57] ABSTRACT

An image reading method and apparatus therefor where charge-coupled devices (CCDs) and similar devices are utilized, especially for making adjustments to compensate for read-out position errors. The apparatus for reading images includes a circuit for generating an adjusted read-out address in order to obtain the desired image signals. The adjusted read-out address is obtained by using the actual data derived from scanning a sample chart with an image device, and computed reference data which is the same data that would be obtained if the sample chart is scanned with an ideal optical system. The sample chart comprises a series of lines provided at regular intervals. An apparatus and method for reading images inexpensively and easily is thus obtained, and which allows the reproduction of original images without distortion, color error or the like.

22 Claims, 8 Drawing Sheets

IMAGE READING METHOD AND APPARATUS

BACKGROUND OF THE INVENTION

1. Field of the invention

The present invention relates to an image reading method and apparatus therefor wherein CCDs and similar devices are utilized, especially when making adjustments to compensate for read-out position errors.

2. Description oft he Prior Art

Figure 1:
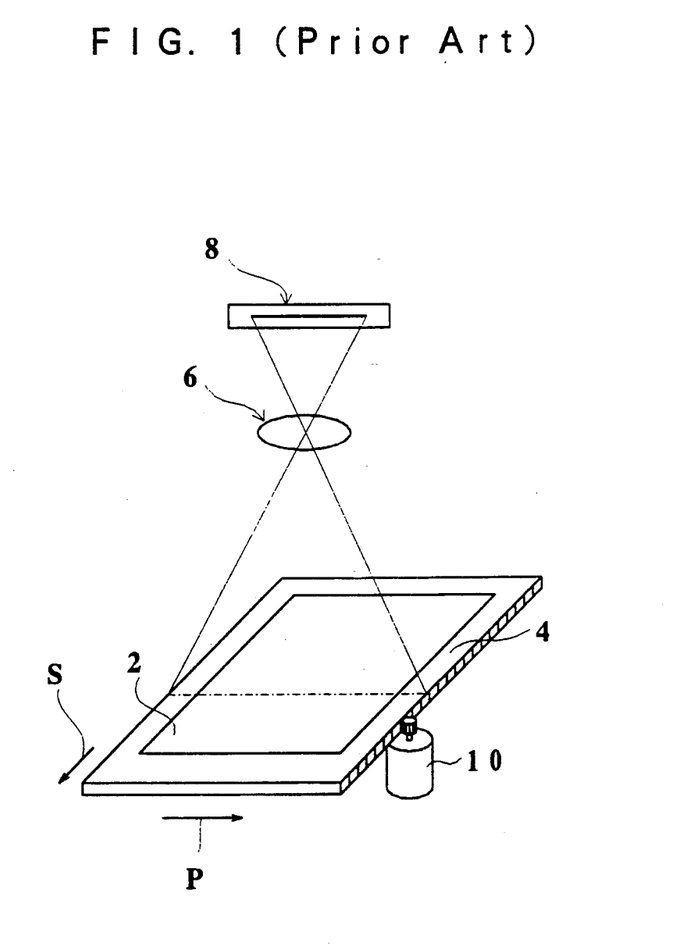
FIG. 1 is a diagram showing a prior art apparatus for reading images.

FIG. 1 shows the principle employed in a prior art apparatus for reading images where a CCD line sensor is utilized. An original image sheet 2 is set on a table 4. A light source, not represented here, is provided above or below the table 4. Beams from the light source are reflected by or pass through the original image 2, then pass through a lens 6 and are focused on a line sensor 8. As the line sensor 8 is comprised of a series of sensors arranged in a line, each individual sensor outputs a signal level corresponding to the degree of density for that portion of the line being scanned from the original image 2.

The table 4 is moved in a secondary direction S, for the subsequent scanning of adjacent lines, by rotating a motor 10. This movement is repeated until all adjacent lines of the original image 2 have been scanned. Using this technique, signal levels corresponding to each point on the original image 2 are obtained.

When a color image is desired for printing and reproduction, the reflected light is separated into an R component, G component and B component, by the use of three line sensors, one for each of the color components. Using the technique for scanning the original image 2, color signals corresponding to each component for an entire image may be obtained. Alternatively, three different colored light sources may be used sequentially with one line sensor to form the R.G.B. signals representing the original image 2.

If there is optical distortion in the primary scanning direction P of an optical system, for example in lens 6, the line sensor 8 will output signals that include the distortion as part of the information contained in the signal. Optical systems without distortion are difficult to build and expensive, especially if the line sensor is used to receive images that are magnified by the optical portions of the scanner. For these reasons, it is difficult to obtain undistorted information in scanning signals. Furthermore, when color image signals are obtained, there will often be an error of the positional information between the signals for the different color components corresponding to the different aspects of aberration introduced by transverse chromatic aberration of the optical system. As the complexity of the optical system increases by requiring color information and other such demands on the optical characteristics of the system, the costs and set-up time increase dramatically while an increase in performance becomes more and more difficult to achieve.

If three line sensors 8 are used to obtain color images, the respective individual sensors in each line sensor 8 must be aligned to correspond to the same point in the original image 2. That is, a positional arrangement must be achieved such that light from a single point on an original image will strike the same sensor respectively in each of the separate line sensors. This positional arrangement is both elaborate and difficult to achieve as well as costly to manufacture.

SUMMARY OF THE INVENTION

It is a primary object of the present invention to solve the problems mentioned above and to make available an apparatus for reading images that will be inexpensive and easily used, and yet print or reproduce images taken from the original without read-out position errors and the like.

An image reading apparatus in accordance with the present invention comprises:

(a) a sample chart on which optically distinguishable lines are drawn at predetermined intervals;

(b) an image device for reading said sample chart and an image, and producing first signals and second signals respectively;

(c) write address generating means for generating a write address according to a clock pulse;

(d) a memory for storing said second signals at said generated write address;

(e) read-out address generating means for generating a read-out address corresponding to said write address; said read-out address being calculated on the basis of said first signals; and (f) read-out means for reading out said second signals from locations of said memory selected by said read-out addresses.

A method for reading images in accordance with the present invention comprises a step of:

(a) reading a sample chart by using an imaging device, said sample chart having optically distinguishable lines, said lines drawn on said sample chart at predetermined intervals;

(b) storing first data derived from reading said sample chart in a memory location selected by a write address generated according to a clock pulse;

(c) calculating a read-out address on the basis of said first data;

(d) reading an image by using said image device;

(e) storing second data derived from reading said image in a memory location selected by an address generated according to a clock pulse; and (f) reading out said second data from a location of said memory selected by said read-out address.

A method for reading images in accordance with the present invention comprises:

(a) scanning a sample chart with an image scanning device, said sample chart having a black line described repeatedly thereupon it at predetermined intervals;

(b) storing first data in appointed write addresses of a memory means, said first data being derived from scanning said sample chart;

(c) reading out said first data stored in said memory means and giving the read-out first data to computing means to calculate a center address;

(d) computing said center addresses of given areas of said sample chart, said given areas corresponding to the area around the center part of each said black line by said computing means;

(e) generating a look-up table, which is made with said computed center addresses and a computed ideal center address obtained if said sample chart is scanned with an ideal optical system;

(f) scanning an image with said image scanning device;

(g) storing second data in appointed write addresses of said memory device, said second data being derived from scanning said image; and (h) reading out said second data stored in said memory means according to adjusted read-out addresses in order to read out data which correspond to said image, whereby when said read-out address is provided to said look-up table, said adjusted read-out address is provided to said memory means to read out data corresponding to said image.

While the novel features of the invention are set forth in a general fashion, particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 2:
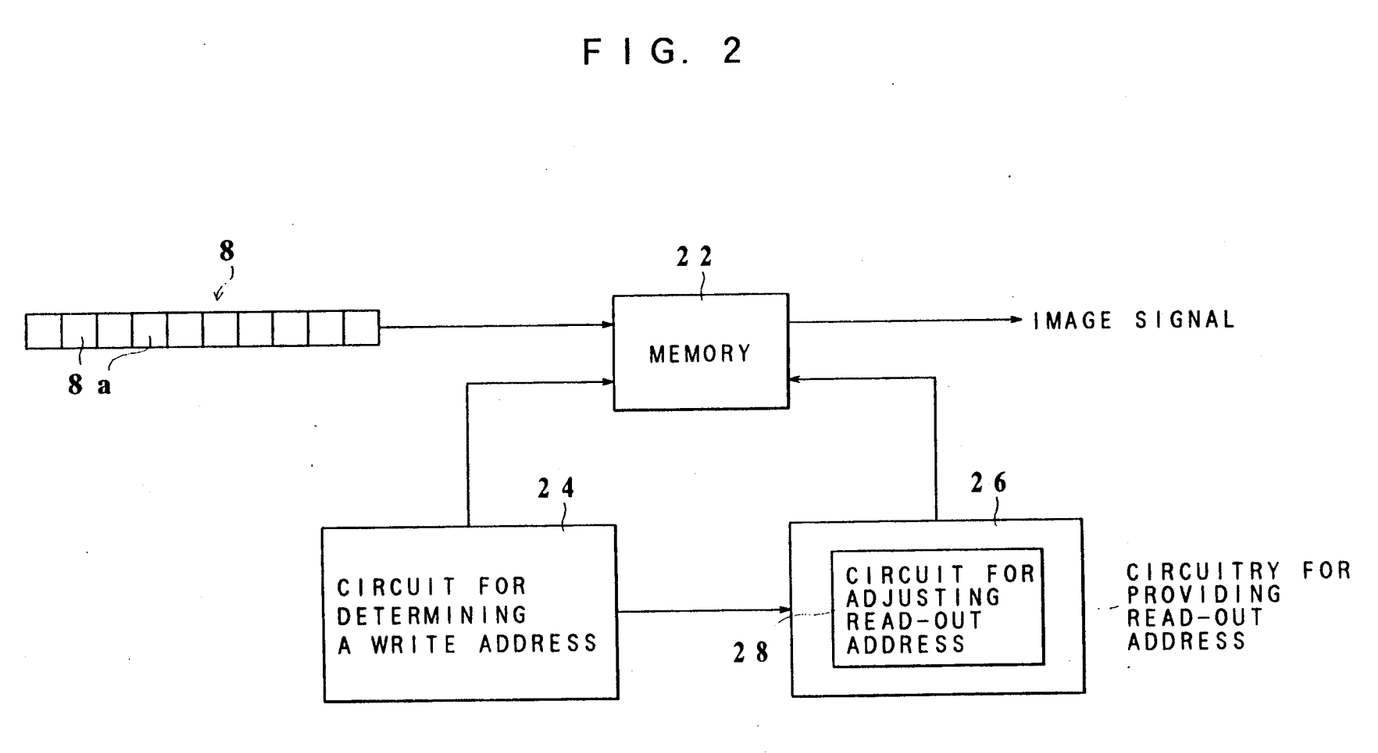
FIG. 2 is a diagram showing an arrangement of apparatus and function blocks of an embodiment of the present invention.
Figure 3A:
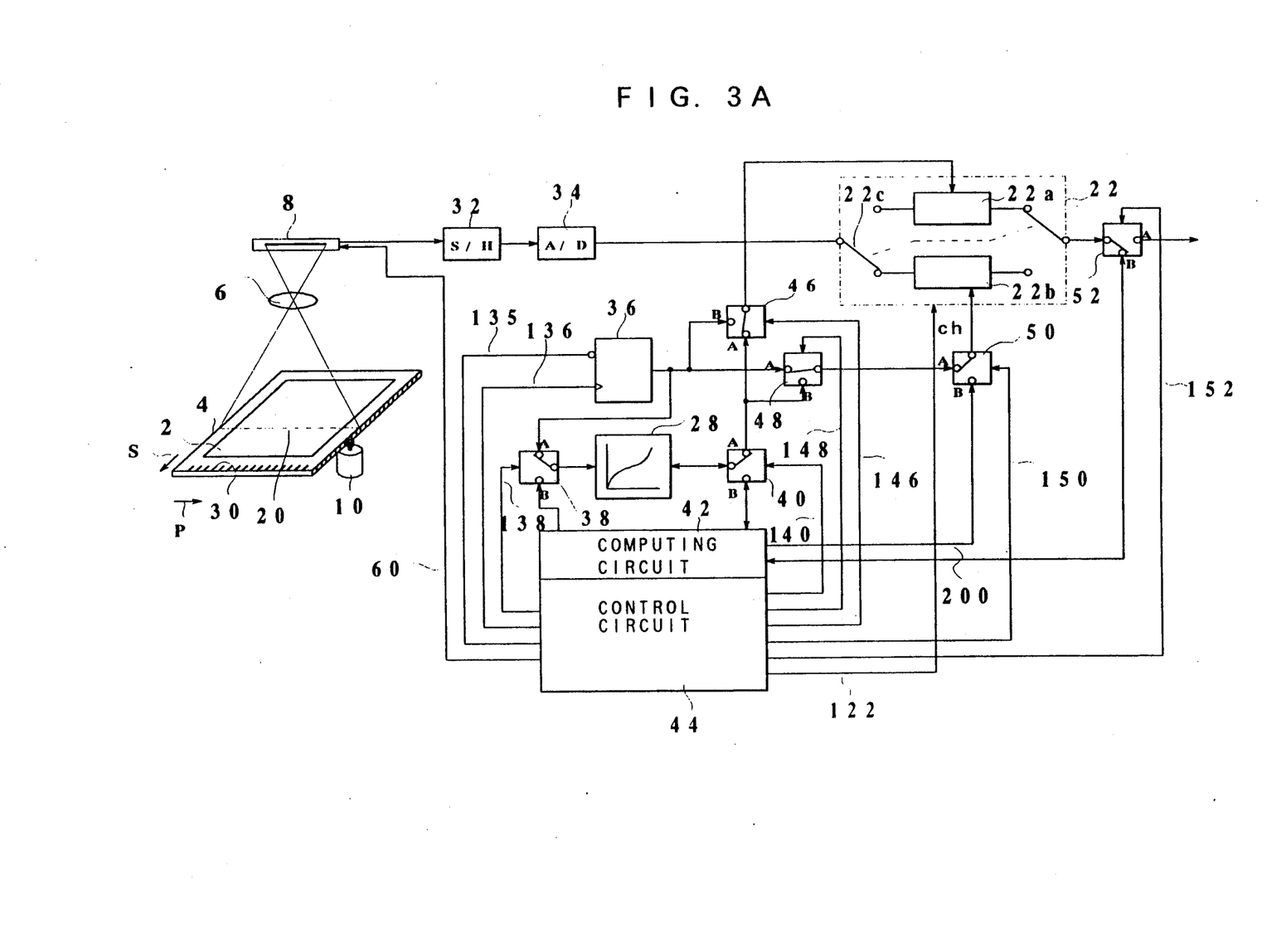
FIGS. 3A and 3B are block diagrams of the invention showing the operations for forming a look-up table in an embodiment of the present invention.

FIG. 2 is a block diagram showing an arrangement of apparatus and function blocks in an embodiment of the present invention. The signals from a CCD line sensor 8 (imaging device), comprising signals from a series of individual sensors 8a arranged in a line, are stored at particular locations in a memory 22 on the basis of address data provided by circuit 24 for determining sequential write addresses. A circuit 26 for providing adjusted read-out addresses comprises a circuit 28 for adjusting read-out addresses which are identical with the write addresses. In the circuit 28 for adjusting the read-out addresses, an adjusted read-out address is obtained by using the actual data derived from scanning the sample chart 30 (See FIG. 3) with the CCD line sensor 8, and the computed data which is the same data that is obtained if the sample chart 30 is scanned with an ideal optical system, the sample chart 30 having a black line 30a provided at regular intervals. The data, in a given memory device location, whose read-out value has been adjusted accordingly, is delivered as an image signal. These compensated image signals are free of optical system distortion or the like, in the primary scanning direction P, that is otherwise added to the images being scanned.

In the present invention, a new mode of operation is necessary to form a look-up table in addition to an ordinary reading mode used to read the original image. This look-up table is used to adjust the read-out addresses. The details of the operations needed to form the look-up table, in an embodiment of the present invention, are shown in FIG. 3A. In the embodiment described above, toggle line memory 22 is used as memory for storing signals from the line sensor 8. A memory 28 is also provided for storing the look-up table. The look-up table for adjusting the read-out address needs to be formed and stored in the memory 28 prior to scanning an original image 2.

The mode to form the look-up table will be described hereinafter. First, the sample chart 30 which is located on the edge of the table 4 is set on a scanning line 20 by rotating the motor 10 and moving the table 4, and then a portion of one line in the sample chart 30 is scanned by the CCD 8. Then control circuit 44 signals gate 48 through control signal line 148 to pass the data from address counter 36 to gate 50, and gate 50 through control signal line 150 to pass data from gate 48 to memory 22b. That is, the output of address counter 36 is given to memory device 22b as address data. Gate 46 is instructed not to pass data from address counter 36 to memory 22a by control circuit 44.

Control circuit 44 provides a drive signal to line sensor 8 through control signal line 60. The CCD line sensor 8, comprises a series of individual sensors 8a arranged in a line. The signals stored in the CCD line sensor 8 are fed to the sample hold circuit 32 on the basis of the signals provided by control signal line 60. The outputs of the sample/hold circuit 32 are converted into their digital equivalents by A/D converter 34.

Control circuit 44 sends an appropriately timed line-start pulse and an image-clock signal to the address counter 36 through the control line 135 and 136 in addition to sending the drive signal to line sensor 8. The line-start pulse is delivered before reading out the data of the portion of the line from the line sensor 8. The image-clock signal output is synchronized with the drive signal output. Therefore, address counter 36 generates a write address data output which is changed regularly corresponding to each of signals from the CCD and synchronized with it. When these address data signals are given to the address input terminal of the memory 22b each signal from the CCD is stored in the appropriate write address which the write address data signal indicates. In this fashion, the data derived from scanning the portion of one line in the sample chart 30 is stored in the memory 22b.

Figure 5:
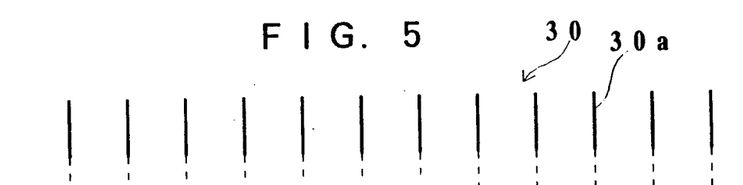
FIG. 5 is a diagram showing a sample chart.
Figure 6:
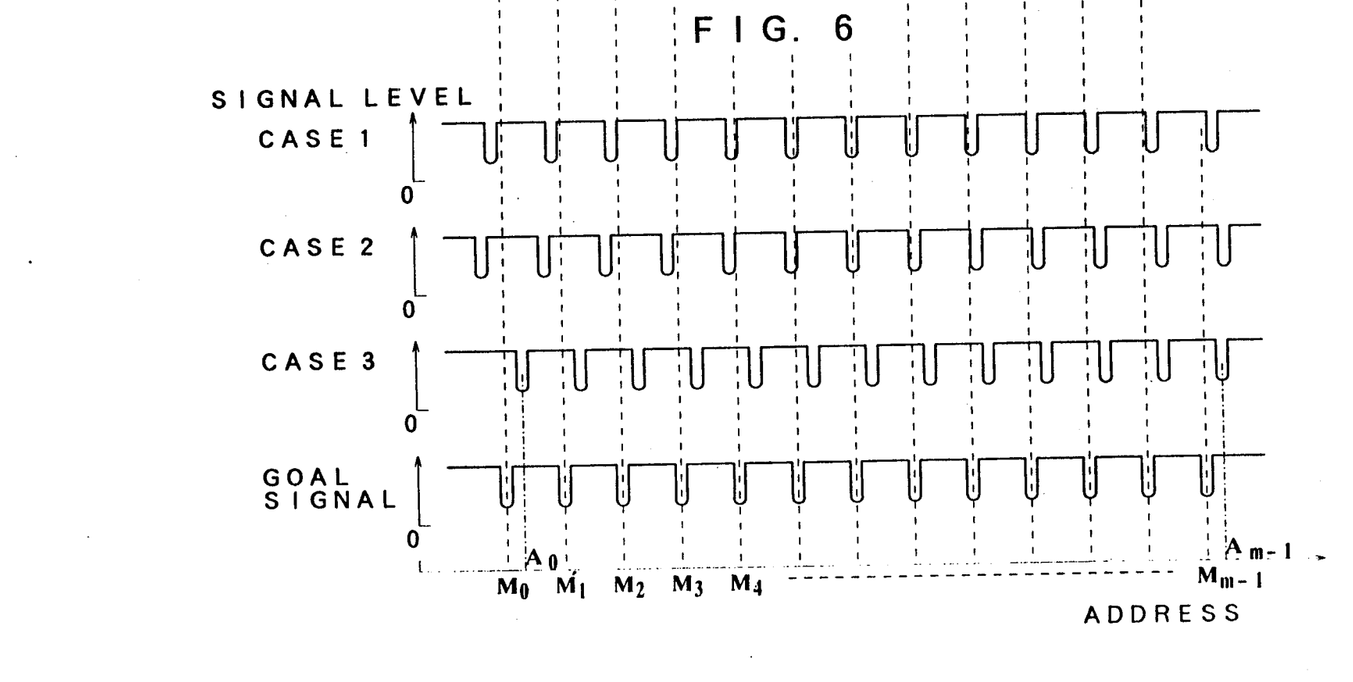
FIG. 6 is a diagram showing signals derived from scanning the original and the signals when they have been adjusted.

FIG. 5 shows the sample chart 30 in accordance with the embodiment of the present invention. The black line 30a is provided at regular intervals in this sample chart 30. When there is distortion or transverse chromatic aberration in the optical system such in the lens 6, then the data that is stored in memory 22b may have errors similar to those shown in cases 1, 2 and 3 of the waveforms of FIG. 6. In FIG. 6, the horizontal axis represents the address of memory 22b.

Figure 3B:
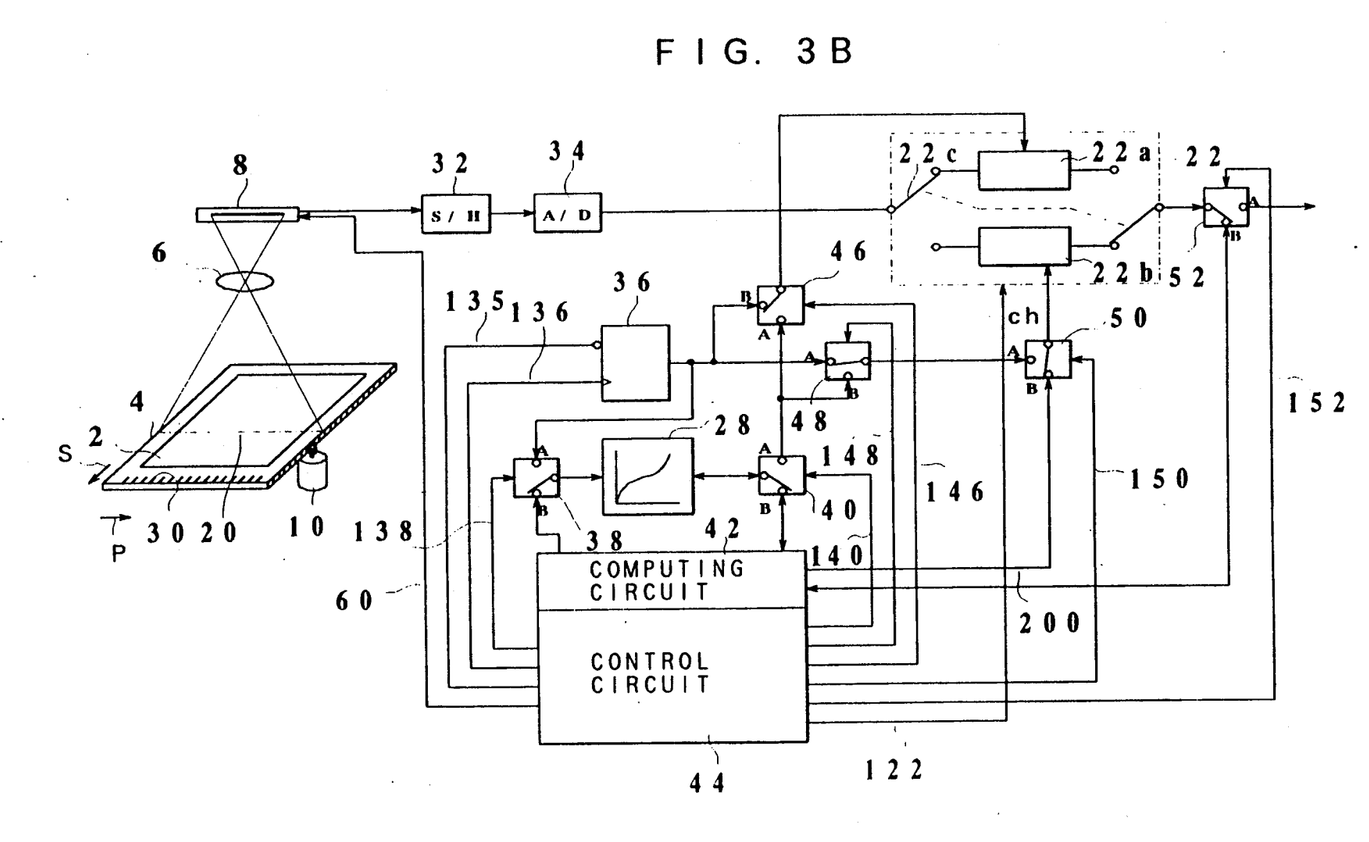

Then control circuit 44 signals the toggle input Ch through control line 122, so that memory 22b is coupled to the output terminal for reading out data. Control circuit 44 signals the gates 38, 40, 50 and 52, through control lines 138, 140, 150 and 152, so that they are coupled to side B. The details of this configuration is shown in FIG. 3B.

Then, as computing circuit 42 sequentially provides a read-out address data signals which are identical with the write addresses to the address input terminal of memory 22b through address line 200, memory 22b generates data outputs which are derived from scanning the sample chart 30. There data outputs are fed through gate 52 into computing circuit 42. Case 1 in the waveforms shown in FIG. 6 is a typical representation of the data outputs mentioned above.

Figure 7:
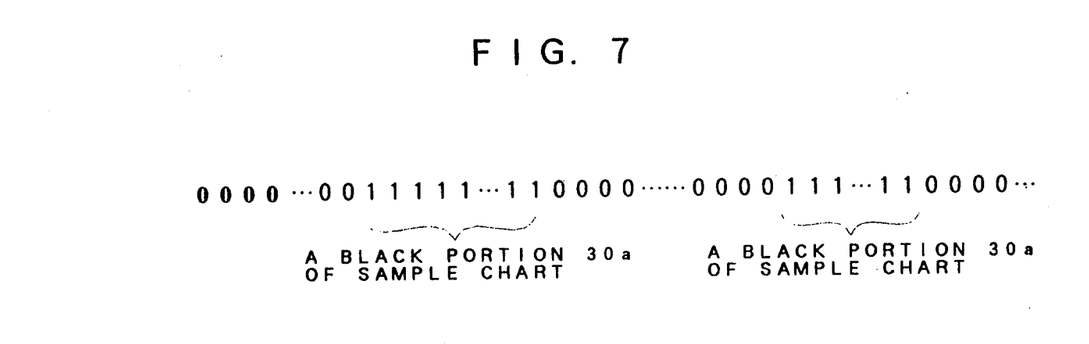
FIG. 7 is a numerical string used in explaining how to compute the center address corresponding to the center part of each black line in the sample chart.

In computing circuit 42, when the level of one of the signal values, as shown in the example of case 1 of the waveform diagram of FIG. 6, is equal to or greater than a predetermined threshold value, the signal value is converted into a value of "1" and when the level of one of the signal values is less than this predetermined threshold value, the signal value is converted into a value of "0". These conversions result in a numerical string similar to that shown in FIG. 7. In other words, within the numerical string each series such as "11111" will represent a black line 30a of the sample chart 30 and each series such as "00000" will represent a white portion. On the basis of the data obtained in this way, computing circuit 42 computes a center address corresponding to the center location of each series representing each black line. For example, when the number of "1"s in a series of value "1" is n and the address corresponding to the first "1" in the series is $a_o$, the measured center address A is given by:

$$A = a_o + (n-1)/2$$

When the number of the black line in the sample chart 30 is m, m pieces of the center address $A_o$ to $A_{m-1}$ are obtained.

If computing circuit 42 has a theoretical center address data $M_o$ to $M_{m-1}$, corresponding to the center location of the numerical string representing each black line 30a obtained form an ideal optical system, then there is no distortion or aberration. The detail of the position of the center address $M_o$ to $M_{m-1}$ is indicated by the dashed lines in FIG. 5 and FIG. 6. In cases 1 and 2, it is understood that read-out position error owing to the optical system or the like has occurred and this error increases as the addresses approach either end. In case 3, it is understood that the positional arrangement of line sensor 8 is misaligned.

Figure 8:
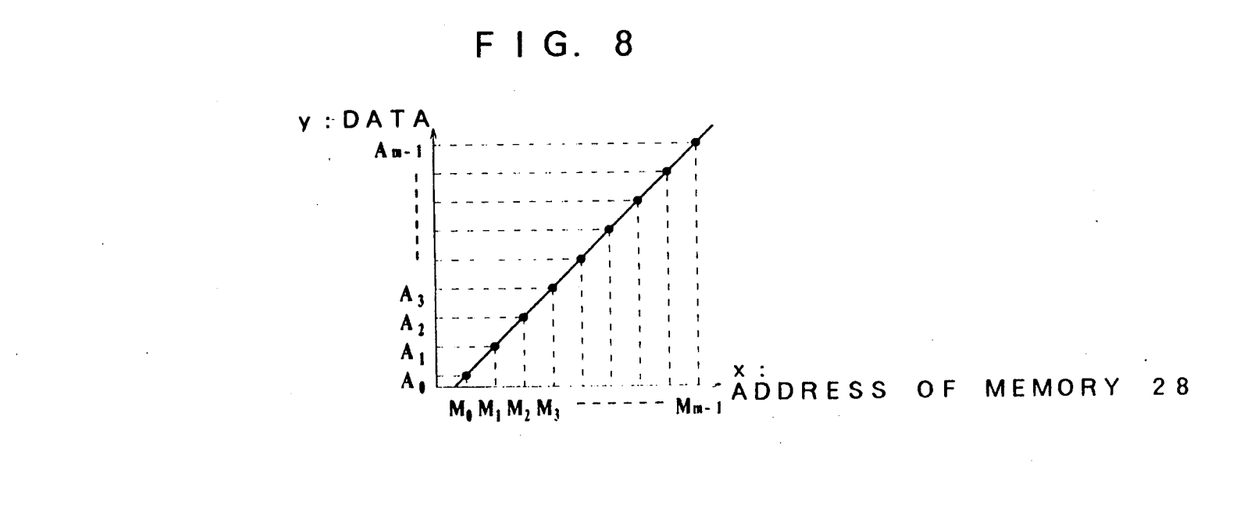
FIG. 8 is a diagram showing a sample look-up table.

Computing circuit 42 gives the center address data $A_o$ through $A_{m-1}$ to the data input terminal of memory 28 through gate 40. In addition it gives the center address data $M_o$ through $M_{m-1}$ signals to the address input terminal of memory 28 through gate 38. Using this scheme, address data $A_o$ is stored in address $M_o$ of memory 28, address data $A_1$ is stored in the address $M_1$ and this action is repeated similarly for all sets of $A_m$ and $M_m$. That is, the look-up table as shown FIG. 8 is formed in memory 28. Meanwhile, address data y, corresponding to the interval address x between one center address and the next center address is given by :

where $x \leq M_1$ $$y = \frac{A_0 - A_1}{M_0 - M_1} \times X + \frac{M_0 \times A_1 - M_1 \times A_0}{M_0 - M_1}$$

where $M_1 \leq X \leq M_2$ $$y = \frac{A_1 - A_2}{M_1 - M_2} \times X + \frac{M_1 \times A_2 - M_2 \times A_1}{M_1 - M_2}$$

.
.
.

where $M_{m-2} \leq X$ $$y = \frac{A_{m-2} - A_{m-1}}{M_{m-2} - M_{m-1}} \times X + \frac{M_{m-2} \times A_{m-1} - M_{m-1} \times A_{m-2}}{M_{m-2} - M_{m-1}}$$

Such continuous function as the "Aitken Function" method, "Lagrange Function" method may be used instead of the method aforementioned, for example.

It is a function of the look-up table thus obtained to generate address data outputs indicating the address where the correct data should have been stored in the toggle-line memory 22 once an address has been given to the look-up table. For example, when the address data $M_o$ is given, the look-up table should generate the address data $A_o$ as its output.

Figure 4A:
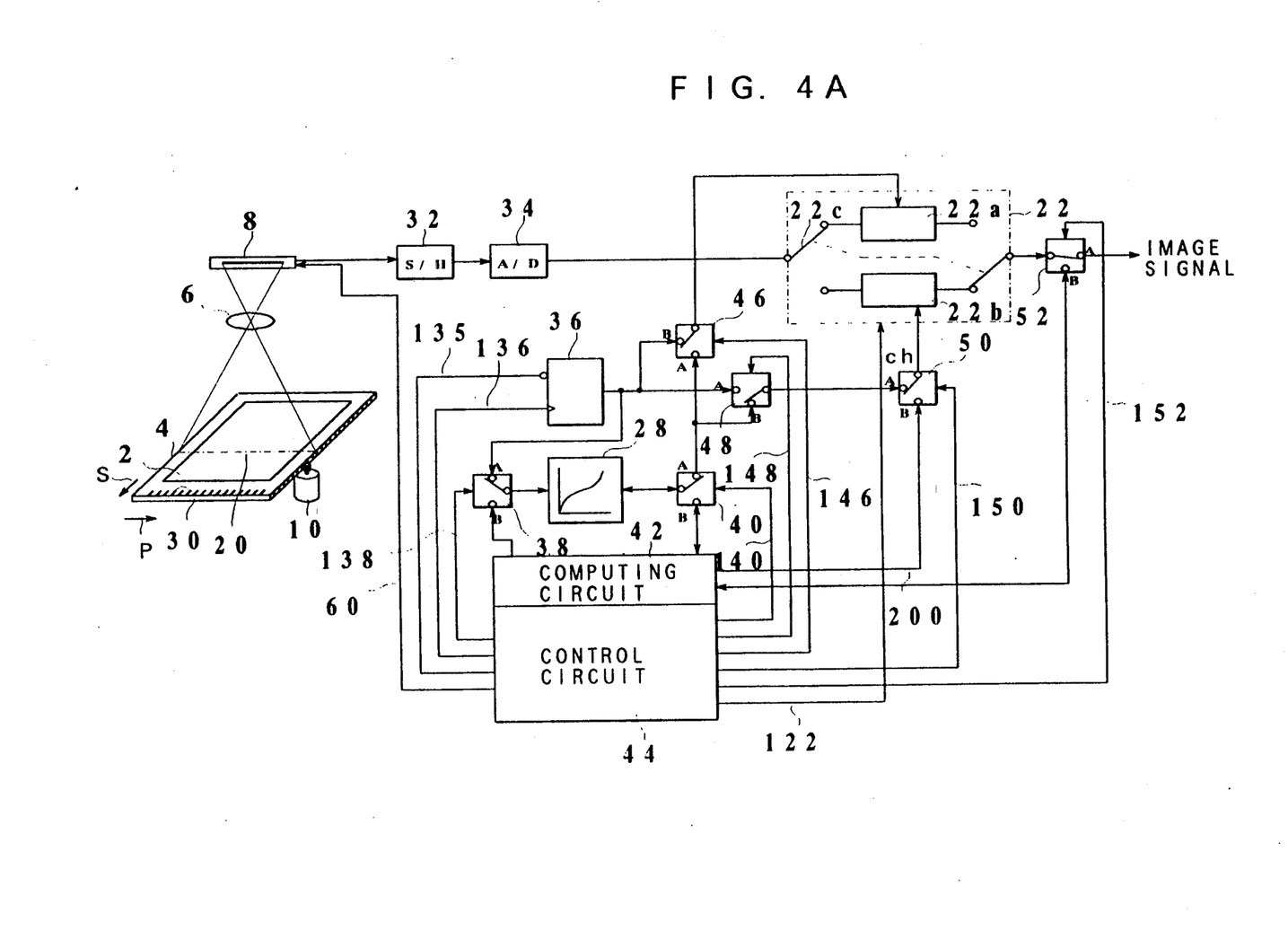
FIGS. 4A and 4B are block diagrams of the invention showing the ordinary operations for reading images in an embodiment of the present invention.

The ordinary mode to read the original image 2 will be described hereinafter. In this mode, control circuit 44 signals gates 46 and 48 to switch and gates 38, 40, 50 and 52 to remain coupled with the side A. In FIG. 4A, gates 46 and 48 are coupled with the side B. Then, the switch signal is given to the toggle input terminal of the toggle line on memory 22. Thereby line memory 22a is ready to be written to and line memory 22b is ready to be read out from.

At this time, analog signals derived from scanning the portion of one line of the original image 2 by the line sensor 8 are converted into digital equivalents by A/D converter 34 in turn. The converted digital signals are sequentially provided to the input of the memory 22a, while, address counter 36 generates an write address data output which is changed regularly according to each of the above mentioned digital signals and synchronized with it. Accordingly, the data of the portion of one line data from line sensor 8 is stored in the memory 22a.

Figure 4B:
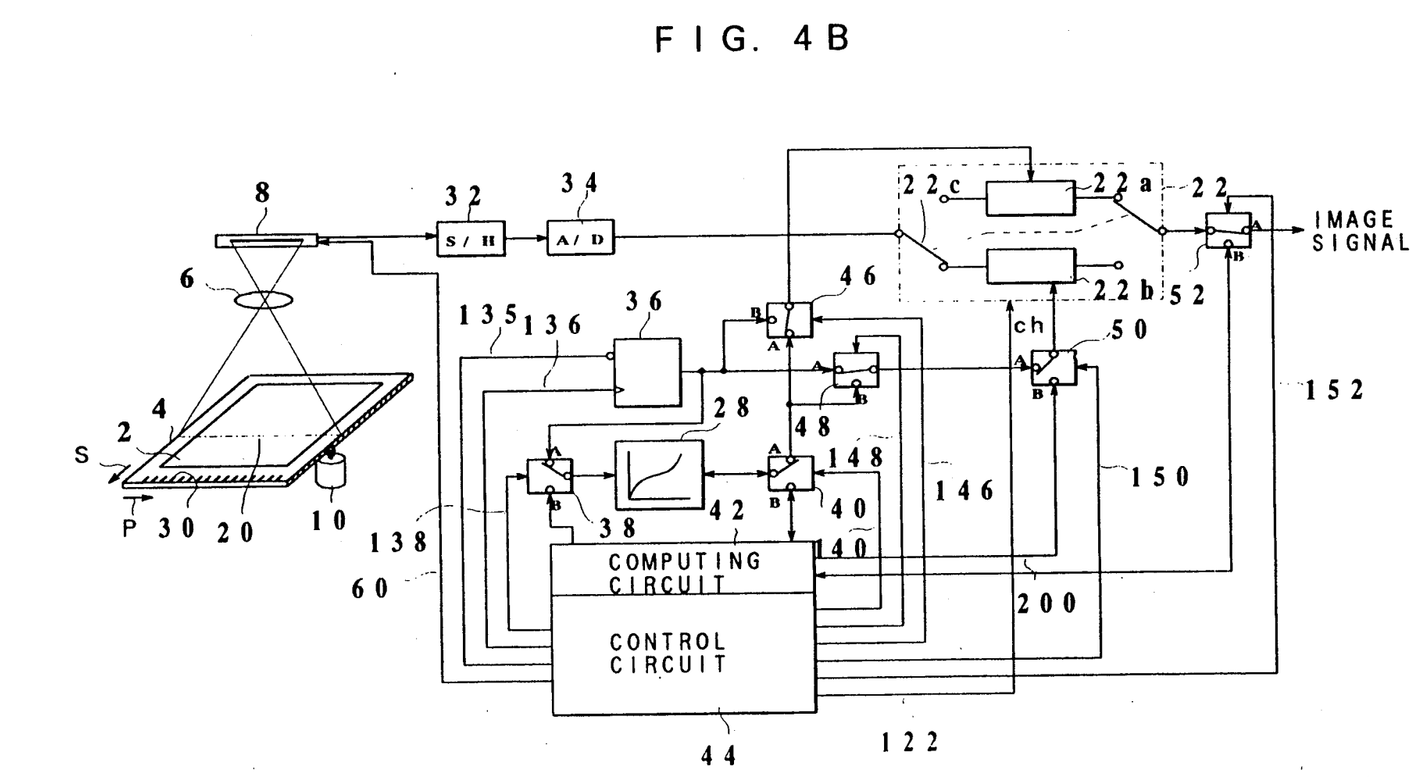

Then, table 4 is moved in the secondary scanning direction S by rotating the motor 10 in order to be prepared to scan the next line of original image 2. At that time, control circuit 44 signals the toggle input Ch terminal to be coupled to the write terminal of memory 22b and to be coupled to the read-out terminal of memory 22a. In addition it signals gates 46 and 48 to be coupled to side A. The details of this configuration are shown in FIG. 4B. Then the next line of data from line sensor 8 is stored in memory 22b in the same fashion.

The write address data from address counter 36 has also been provided to the input terminal of memory 28 through gate 38. Memory 28 already has the record of the look-up table for adjusting the read-out address. Accordingly, Memory 28 generates the adjusted read-out address data output to compensate for any image position error. The adjusted read-out address is given to memory 22a through gates 40 and 46. The data output from a given memory device location, that is pointed at by the adjusted read-out address obtained in this way, is thus generated. The read-out data is delivered through gate 52 as the image signal which is changed into the goal signal as shown in FIG. 6. The apparatus returns to the status shown in FIG. 4A after each such operation. The operation is then repeated in the same fashion for each line to be scanned.

In the embodiment described above, the adjustment of the read-out address is effected by computing the center address corresponding to the center portion of the black line 30a in the sample chart 30. When the adjustment is to be made on the basis of the bar-pattern in the sample chart 30, any other means may also be used. For example, the adjustment of the read-out address may be effected on the basis of an address corresponding to the beginning or ending portion of black line 30a.

In the adjustment of the read-out address heretofore described, the look-up table is used to obtain the adjusted read-out address. The adjusted read-out address may also be created directly by a computing circuit instead of by using a look-up table. Image data from the sample chart 30 may also be obtained by averaging two sets of data derived by scanning the sample chart 30 twice at the same location.

In an apparatus of the present invention, the adjusted read-out address is obtained by using the actual data derived from scanning the sample chart 30 with an image device, and the computed data which is the same data that is obtained if the sample chart 30 is scanned with an ideal optical system. Therefore, an apparatus constructed according to the present invention can output a goal image signal which is obtained by adjusting the distorted read data, the distortion resulting from an imperfect optical system or the positional arrangement of the line sensor. That is, the present invention makes available an apparatus for reading images that will be inexpensive and easy to arrange, and yet print or reproduce the original image without distortion, read-out position error or the like occurring. Moreover, quick response may be effected by using a look-up table.

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. An image reading apparatus comprising:
   (a) a sample chart on which optically distinguishable lines are provided at predetermined intervals;
   (b) an image device for reading said sample chart and an image, and for producing first signals in response to the sample chart and second signals in response to the image, respectively;
   (c) write address generating means for generating write addresses in response to a clock signal;
   (d) a memory for storing said second signals at respective ones of said write addresses;
   (e) read-out address generating means for generating read-out addresses corresponding to said write addresses; said read-out addresses being calculated in accordance with a parameter of said first signals; and
   (f) read-out means for reading out said second signals from locations of said memory selected by said read-out addresses.

2. An apparatus in accordance with claim 1 wherein: said read-out address generating means comprises a look-up table which represents a relationship between said read-out addresses and said write addresses.

3. An apparatus in accordance with claim 1 wherein: said sample chart is provided of a table for setting said image thereon.

4. An image reading method comprising the steps of:
   (a) reading a sample chart with an image device, said sample chart having optically distinguishable lines, said lines provided on said sample chart at predetermined intervals;
   (b) storing first data derived from reading said sample chart in a memory location selected by a write address generated in response to a clock pulse;
   (c) calculating a read-out address according to a parameter of said first data;
   (d) reading an image with said image device;
   (e) storing second data derived from reading said image in a memory location selected by a write address generated in response to a clock pulse; and
   (f) reading out said second data from a location of said memory selected by said read-out address calculated using said first data.

5. A method in accordance with claim 4, wherein said step (c) comprises the steps of:
   (c-1) forming relation data between said read-out address and said write address on the basis of said first data and predetermined reference data; and
   (c-2) determining said read-out address corresponding to said write address in response to said relation data.

6. A method in accordance with claim 5 wherein: said relation data is stored in a memory as a look-up table.

7. A method of reading images comprising:
   (a) scanning a sample chart with an image scanning device, said sample chart having a line provided repeatedly thereon at predetermined intervals;
   (b) storing first data in appointed write addresses of a memory means, said first data being derived from scanning said sample chart;
   (c) reading out said first data stored in said memory means and providing said read-out first data to computing means to calculate center addresses for said first data, said center addresses comprising addresses in said memory means corresponding to prescribed areas of said sample chart;
   (d) computing said center addresses of prescribed areas of said sample chart, said prescribed areas corresponding to the areas around the center part of each said line of said sample chart;
   (e) generating a look-up table, from said computed center addresses and a reference center address, said reference center address corresponding to an ideal center address obtained if said sample chart is scanned with an ideal optical system;
   (f) scanning an image with said image scanning device;
   (g) storing second data in appointed write addresses of said memory device, said second data being derived from scanning said image; and
   (h) reading out said second data stored in said memory means according to adjusted read-out addresses in order to read out data which correspond to said image, said adjusted read-out addresses being generated in accordance with data stored in said look-up table,
   whereby when said read-out addresses are provided to said look-up table, said adjusted read-out addresses are provided by said look-up table to said memory means to read out data corresponding to said image.

8. A method in accordance with claim 7 wherein said sample chart is disposed on a support table on which said image is also disposed.

9. An image reading apparatus comprising:
   an image recording device for reading a sample chart on which optically distinguishable figures are provided at predetermined intervals and for further reading an image to be reproduced, and for producing first signals in response to the sample chart and second signals in response to the image, respectively;

means for generating write addresses;

a memory for storing said second signals at respective ones of said write addresses;

means for generating read-out addresses, said read-out addresses being computed in response to variations between said first signals produced when reading said sample chart and reference data corresponding to ideal positions of said figures on said sample chart; and read-out means for reading out said second signals from locations of said memory corresponding to said computed read-out addresses.

10. An apparatus in accordance with claim 9, wherein said read-out address generating means comprises means for determining a relationship between said read-out addresses and said write addresses.

11. An apparatus in accordance with claim 10, wherein said read-out address generating means comprise means for generating said relationship, said relationship comprising a relationship between actual positions of said first signals produced in response to said sample chart and said reference data defining theoretical ideal positions of said figures on said sample chart.

12. An apparatus in accordance with claim 11, wherein said read-out address generating means comprises means for computing addresses of prescribed areas of said sample chart, said prescribed areas corresponding to regions around prescribed parts of each figure of said sample chart.

13. An apparatus in accordance with claim 12, wherein said prescribed areas comprise the centers of figures on said sample chart.

14. An apparatus in accordance with claim 13, wherein said figures comprise lines.

15. An apparatus in accordance with claim 10, wherein said read-out address generating means comprises a look-up table in which the relationship between said read-out addresses and said write addresses is stored.

16. A method for reading an image comprising:

providing a sample chart having optically distinguishable figures thereon at predetermined intervals;

reading said sample chart and an image to be reproduced with an image recording device, and producing first signals in response to the sample chart and second signals in response to the image, respectively;

generating write addresses;

storing said second signals at respective ones of said write addresses in a memory;

generating read-out addresses, said step of generating read-out addresses comprising computing read-out addresses in response to variations between said first signals produced when reading said sample chart and reference signals corresponding to ideal positions of said figures on said sample chart; and reading out said second signals from locations of said memory corresponding to said computed read-out addresses.

17. A method in accordance with claim 16, wherein said step of generating read-out addresses comprises generating a relationship between said read-out addresses and said write addresses.

18. A method in accordance with claim 17, wherein said step of generating a relationship comprises determining a relationship between actual positions of said first signals produced in response to said sample chart and said reference data defining ideal positions of said figures on said sample chart.

19. A method in accordance with claim 18, wherein said step of generating a relationship comprises computing addresses of prescribed areas of said sample chart, said prescribed areas corresponding to regions around prescribed parts of each figure of said sample chart.

20. A method in accordance with claim 19, wherein said prescribed areas comprise the centers of figures on said sample chart.

21. A method in accordance with claim 20, wherein said figures comprise lines.

22. A method in accordance with claim 17, wherein said step of generating read-out addresses comprises generating a look-up table in which the relationship between said read-out addresses and said write addresses is stored.

* * * * *